(12) United States Patent
Lange

(10) Patent No.: US 6,695,385 B1
(45) Date of Patent: Feb. 24, 2004

(54) VEHICLE CONVERTIBLE ROOF

(75) Inventor: Eric W. Lange, Dearborn, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/403,362

(22) Filed: Mar. 31, 2003

(51) Int. Cl.$^7$ .................................................. B60J 7/00
(52) U.S. Cl. ............................ 296/107.12; 296/107.09; 296/108; 296/107.07
(58) Field of Search ............................ 296/107.12, 116, 296/108, 117, 107.07, 107.09, 122, 107.16, 121, 107.08, 107.13

(56) References Cited

U.S. PATENT DOCUMENTS

| | | | |
|---|---|---|---|
| 1,160,947 A | | 11/1915 | Nelson |
| 1,390,554 A | | 9/1921 | Hedges |
| 1,390,555 A | | 9/1921 | Hedges |
| 2,289,173 A | | 7/1942 | Best |
| 2,482,323 A | | 9/1949 | Cromwell et al. |
| 2,772,114 A | | 11/1956 | Hennessy |
| 3,075,804 A | | 1/1963 | Geiger et al. |
| 3,655,238 A | | 4/1972 | Stewart |
| 4,708,389 A | | 11/1987 | Maebayashi et al. |
| 4,747,635 A | | 5/1988 | Wagner |
| 4,801,173 A | | 1/1989 | Trenkler |
| 5,002,330 A | | 3/1991 | Koppenstein et al. |
| 5,004,291 A | * | 4/1991 | Bauer et al. ................. 296/116 |
| 5,106,145 A | | 4/1992 | Corder |
| 5,161,852 A | * | 11/1992 | Alexander et al. .......... 296/108 |
| 5,207,474 A | | 5/1993 | Licher et al. |
| 5,253,915 A | | 10/1993 | Schnader et al. |
| 5,259,658 A | | 11/1993 | Koppenstein et al. |
| 5,645,309 A | * | 7/1997 | Graf ............................ 296/117 |
| 5,685,596 A | * | 11/1997 | Tokarz et al. .......... 296/107.07 |
| 5,749,619 A | | 5/1998 | Mentink |
| 5,749,621 A | | 5/1998 | Smith |
| 5,772,274 A | * | 6/1998 | Tokarz ................... 296/107.09 |
| 5,829,821 A | | 11/1998 | Aydt et al. |
| 5,903,119 A | * | 5/1999 | Laurain et al. ........ 296/107.09 |
| 5,938,271 A | | 8/1999 | Schuler et al. |
| 5,967,591 A | | 10/1999 | Muehlhausen |
| 5,998,948 A | * | 12/1999 | Lange et al. ................. 296/122 |
| 6,027,162 A | | 2/2000 | Smith |
| 6,039,382 A | | 3/2000 | Mather et al. |
| 6,048,021 A | * | 4/2000 | Sautter, Jr. ............. 296/107.09 |
| 6,068,326 A | | 5/2000 | Shiromura |
| 6,139,087 A | * | 10/2000 | Wolfmaier et al. .... 296/107.16 |
| 6,155,614 A | | 12/2000 | Lange |
| 6,209,945 B1 | | 4/2001 | Aydt et al. |
| 6,217,104 B1 | * | 4/2001 | Neubrand .................... 296/108 |
| 6,257,649 B1 | * | 7/2001 | Andersson et al. .... 296/107.12 |
| 6,290,281 B1 | * | 9/2001 | Durrani et al. ............. 296/121 |
| 6,293,605 B2 | * | 9/2001 | Neubrand .............. 296/107.08 |
| 6,299,234 B1 | * | 10/2001 | Seel et al. ............. 296/107.12 |

(List continued on next page.)

FOREIGN PATENT DOCUMENTS

| | | |
|---|---|---|
| DE | 42 03 288 | 2/1992 |
| EP | 0 592 109 | 4/1994 |
| WO | WO 94/26544 | 11/1994 |

*Primary Examiner*—Kiran Patel
(74) *Attorney, Agent, or Firm*—Harness, Dickey & Pierce, P.L.C.

(57) ABSTRACT

A convertible roof system for an automotive vehicle include a roof bow that is operable between extended and retracted positions to vary tension of the roof cover and is actuated by a link that travels along a camming surface when the folding mechanism supporting the cover moves between the raised and stowed position.

12 Claims, 13 Drawing Sheets

U.S. PATENT DOCUMENTS

| | | |
|---|---|---|
| 6,322,137 B1 | 11/2001 | Munsters |
| 6,325,446 B1 | 12/2001 | Wuellrich et al. |
| 6,325,452 B1 | 12/2001 | Sanders et al. |
| 6,328,372 B1 | 12/2001 | Just |
| 6,343,829 B2 | 2/2002 | Busch |
| 6,390,530 B1 | 5/2002 | Maass |
| 6,409,247 B1 * | 6/2002 | Maass .................. 296/107.13 |
| 6,497,447 B1 * | 12/2002 | Willard ................. 296/107.12 |
| 6,508,502 B2 * | 1/2003 | Willard ................. 296/107.07 |
| 6,561,566 B2 * | 5/2003 | Dintner et al. ......... 296/107.09 |
| 2001/0006297 A1 * | 7/2001 | Dintner et al. ......... 296/107.17 |
| 2001/0040385 A1 * | 11/2001 | Obendiek ................... 296/108 |
| 2002/0084673 A1 | 7/2002 | Neubrand |
| 2002/0185886 A1 * | 12/2002 | Obendiek ................... 296/108 |
| 2003/0034668 A1 * | 2/2003 | Quindt ....................... 296/108 |
| 2003/0057728 A1 * | 3/2003 | Sims ..................... 296/107.09 |
| 2003/0146642 A1 * | 8/2003 | Mandl et al. .......... 296/107.12 |
| 2003/0193211 A1 * | 10/2003 | Neubrand .............. 296/107.07 |

* cited by examiner

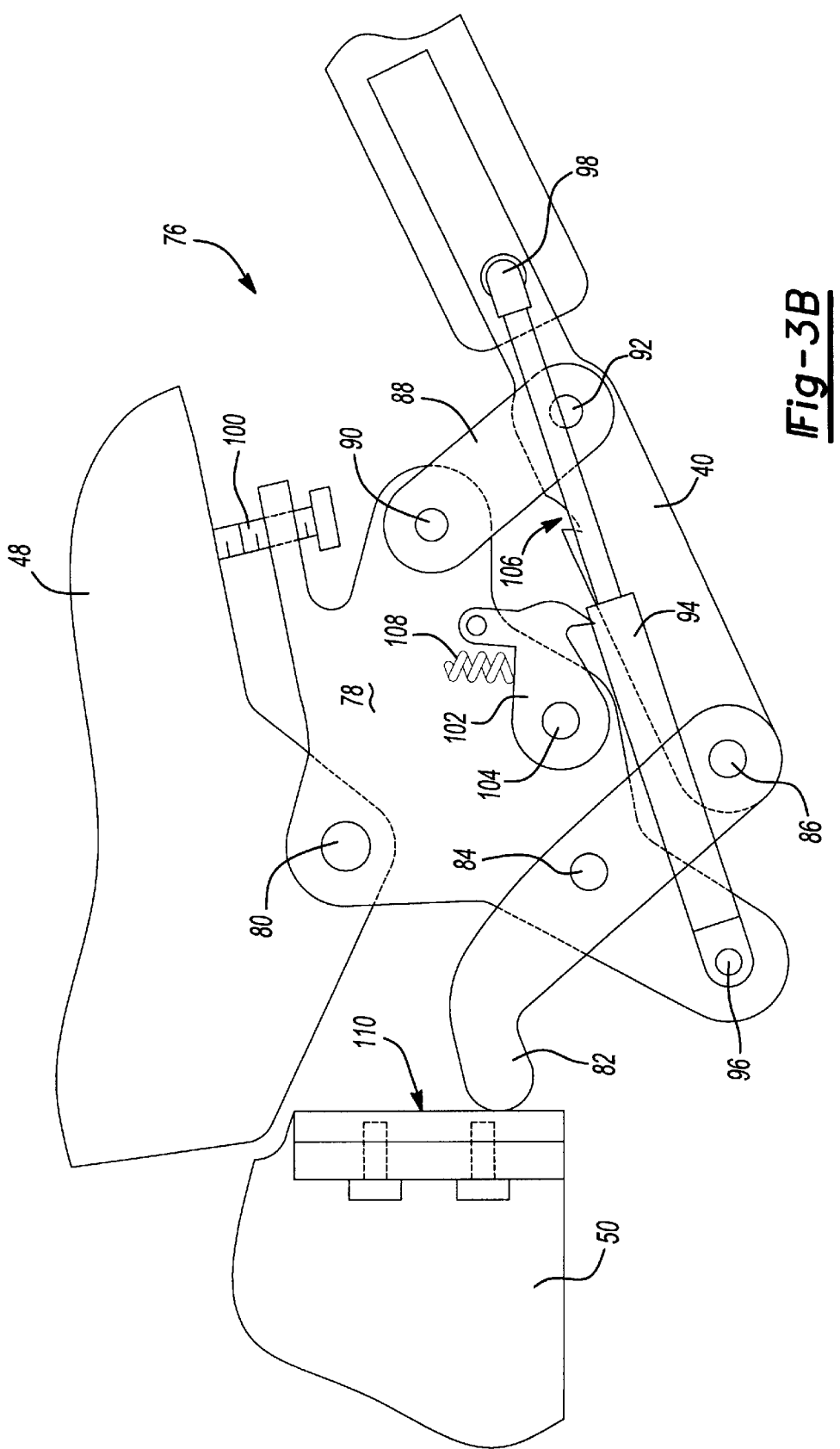

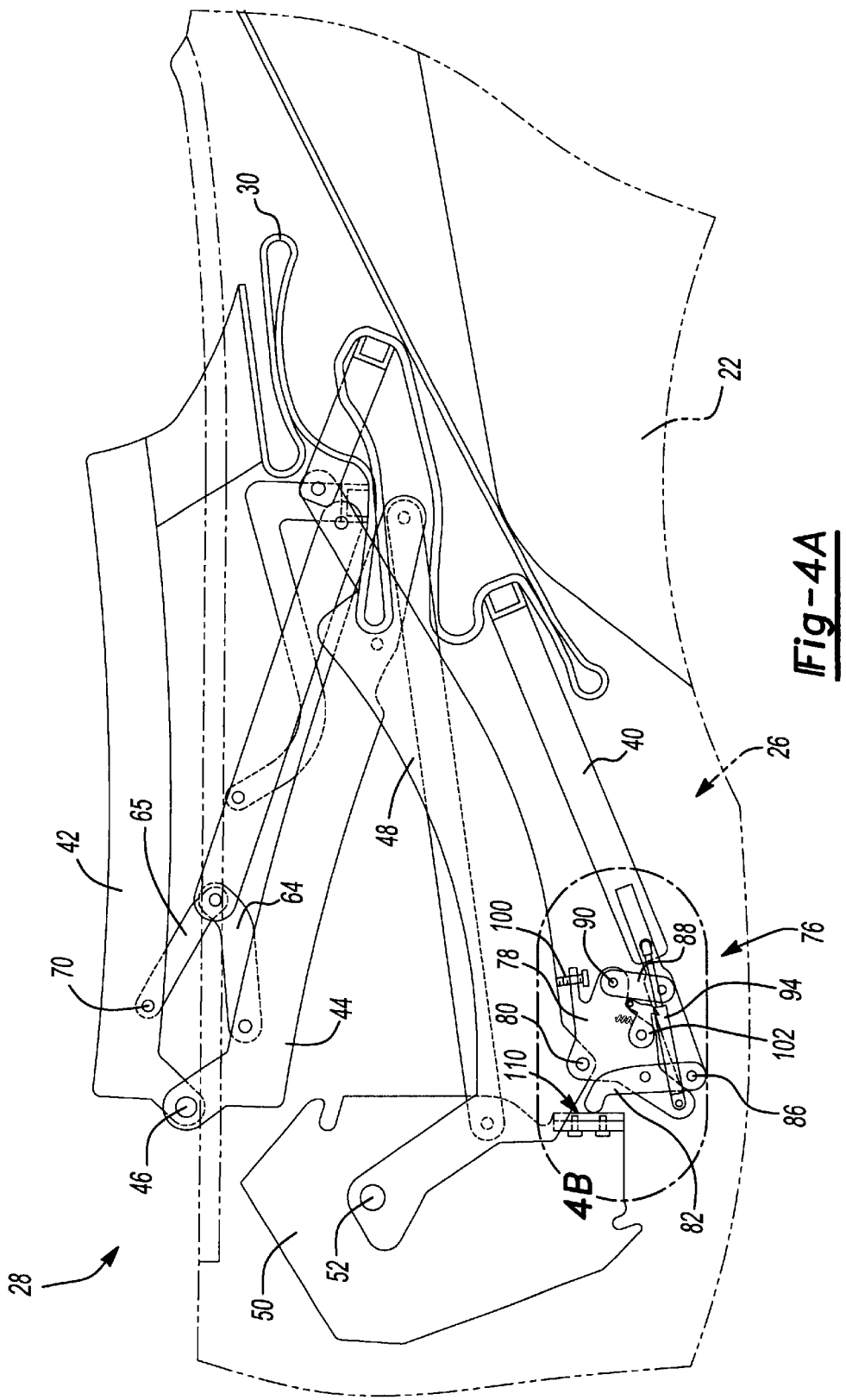

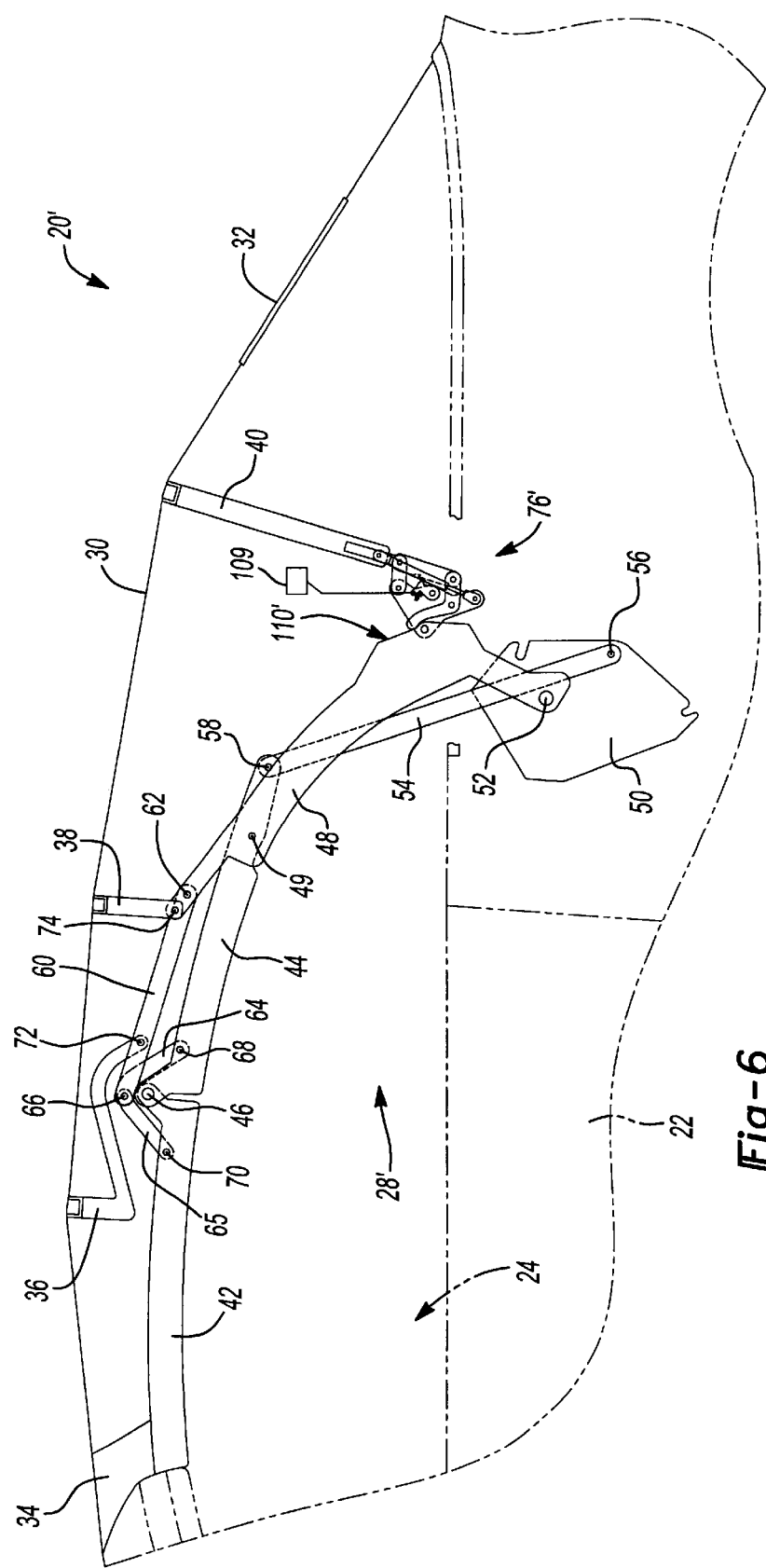

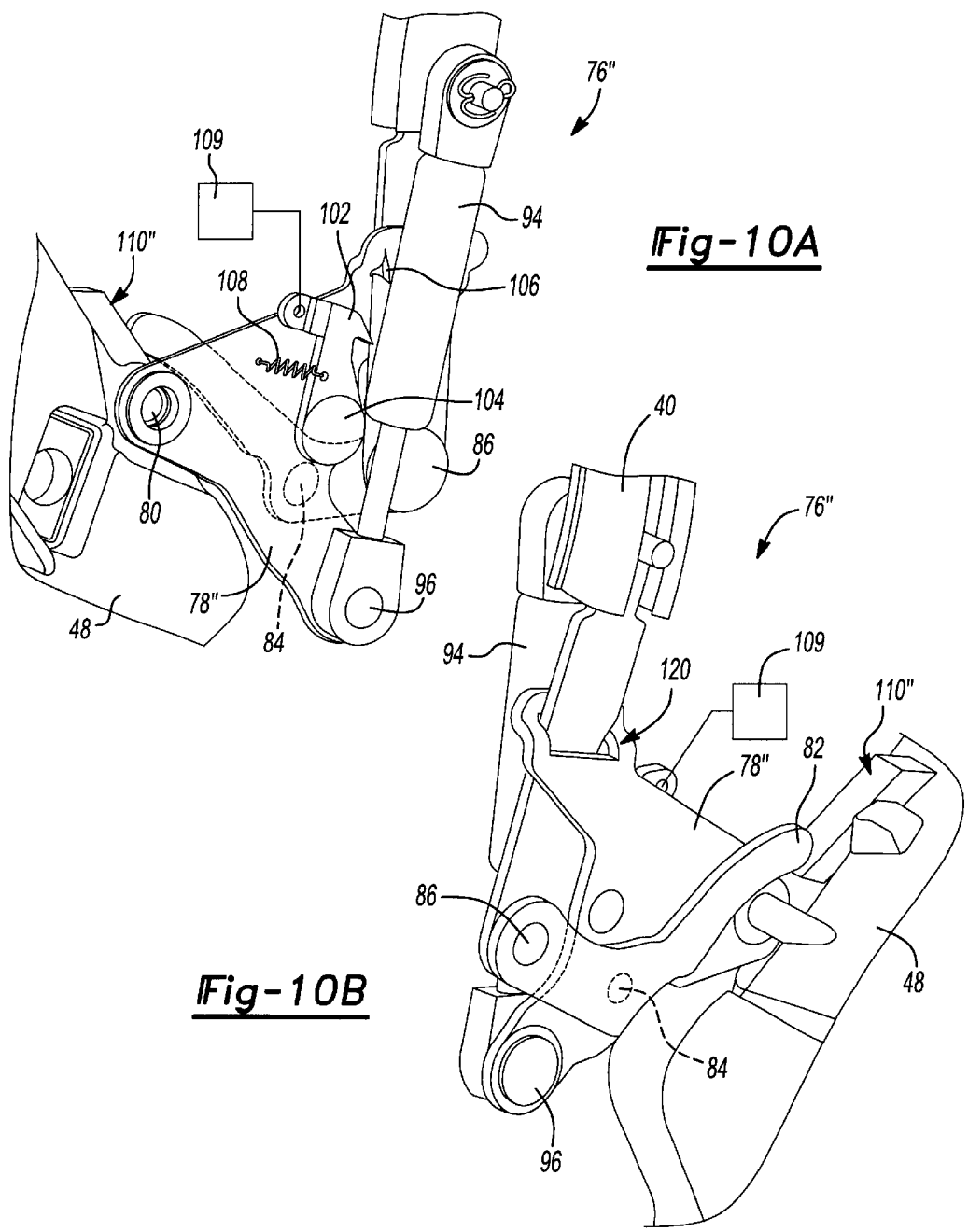

VEHICLE CONVERTIBLE ROOF

BACKGROUND AND SUMMARY OF THE INVENTION

The present invention generally relates to vehicle convertible roofs, and more particularly to a vehicle convertible roof having a roof bow that is moveable to vary tension of the convertible roof.

Traditional soft-top convertible roofs for automotive vehicles typically employ three, four or five roof bows, having an inverted U-shape spanning transversely across the vehicle for supporting a vinyl, canvas or polyester fabric pliable roof cover. A number one roof bow is mounted to a pair of front roof rails and is typically latched to a stationary front header panel of the automotive vehicle body disposed above the front windshield. A number two roof bow is typically mounted to a pair of center roof rails which are pivotally connected to the front roof rails. Furthermore, a number three, four and any additional optional roof bows are commonly mounted to a pair of rear roof rails which are pivotally coupled to the center roof rails. The roof cover can also have a hard or rigid portion along with the pliable portion. For example, reference should be made to U.S. Pat. No. 5,429,409 entitled "Convertible Top", which is incorporated by reference herein.

The roof cover fabrics are exposed to a full range of weather environments and are expected to maintain their original appearance for several years. Due to these durability requirements, the roof covers are normally quite heavy and multi-layered, such as vinyl on cloth or two layers of cloth with an elastomer interlayer. The technical specifications are quite stringent and the fabrics exhibit relatively little stretch. However, the roof covers relax substantially in the sunshine or hot environments and shrink in cold environments.

To compensate for the relaxing and shrinking of the cover, great care must be taken when designing the cover and the top stack mechanism of the convertible roof to achieve a taut cover surface without wrinkles regardless of the environmental conditions. Furthermore, care must also be taken to achieve such a surface while still permitting easy pull-down and latching (by the driver in the case of a manually operated convertible roof). To achieve this balance, first-time closure efforts often range between 100 to 200 pounds at the factory. After the top stack mechanism remains in the raised position and latched for several days, this effort normally drops to about 30 to 50 pounds, which is considered acceptable. However, if the top stack mechanism remains in the stowed position for a period of several days, it may become difficult to latch on the first cycle because of the tendency of the cover to return to its nominal unstretched dimensions. Various "stretchable" roof cover fabrics have been tried without success, thereby increasing the incentive to find a means for optimizing a balance between easy latching and taut appearance while utilizing the present types of fabrics that are employed in the roof covers.

The problem of high latching efforts is caused by the varying tension in the cover material which is acting against the forward movement of the number one roof bow to latch to the stationary front header panel. Force vector analysis indicated that a pull-down force of 20 to 50 pounds at the number one roof bow may be counter balanced with a force of 20 to 50 pounds acting in the plane of the number four roof bow, which yields a force of about 200 pounds in fabric tension of the roof cover. This level of force is adequate for maintaining a taut appearance in a properly fitted roof cover. Thus, if the tension in the roof cover could be limited by making the number four bow adjustable, easy latching can be assured along with a taut appearance.

In accordance with the present invention, a convertible roof system for an automotive vehicle includes a roof bow that is operable between extended and retracted positions to vary tension of the roof cover and is actuated by a link that travels along a camming surface when the folding mechanism supporting the cover moves between the raised and stowed position. In another aspect of the present invention, a latching member is operable to latch an adjustable roof bow in a retracted position and retains the roof bow in the retracted position as the convertible roof system moves from a stowed position to a raised position. In a further aspect of the present invention, a vehicle convertible roof system with an adjustable roof bow uses a multi-link assembly that couples the roof bow to a roof rail. The multi-link assembly includes a first link and a second link that encircles the first link and slides along the first link as the adjustable roof bow moves between extended and retracted positions. In still another aspect of the present invention, a method of operating a convertible roof system is disclosed. The method includes latching an adjustable roof bow in the retracted position, maintaining the roof bow in the retracted position as the convertible top system moves from a stowed position to a raised position and tensioning the cover of the convertible top system by moving the adjustable roof bow to the extended position when the system is in the raised position.

The present invention is advantageous over traditional convertible roofs in that the adjustable roof bow enables the convertible top to have an acceptable pull-down force while also providing adequate tensioning of the roof cover after being latched to the front windshield header. Furthermore, the present invention is advantageous because it can use existing roof cover fabrics to provide such pull-down forces and appearance. The convertible roof of the present invention is also advantageous in that the retracting of the adjustable roof bow is performed as part of the movement of the convertible roof to the stowed position and, as a result, does not require complex control schemes or linkage assemblies. Additional advantages and features of the present invention will become apparent from the following description and appended claims taken in conjunction with the accompanying drawings.

BRIEF DESCRIPTION OF THE DRAWINGS

The present invention will become more fully understood from the detailed description and the accompanying drawings, wherein:

FIG. 3B is an enlarged fragmented view of a portion of the convertible roof of FIG. 3A within circle 3B;

FIG. 4A is a fragmented side elevation view of the vehicle of FIG. 1 with the convertible roof in a fully stowed position and the adjustable roof bow in its retracted position;

FIG. 6 is a fragmented side elevation view of a vehicle with a first alternate embodiment of a convertible roof according to the principles of the present invention with the convertible roof in a raised and latched position and an adjustable roof bow in an extended position and with a camming surface affixed to the rear roof rail;

FIGS. 10A and B are opposite fragmented side elevation views of a portion of a second alternate embodiment of a convertible roof according to the principles of the present invention.

DETAILED DESCRIPTION OF THE PREFERRED EMBODIMENT

The following description of the preferred embodiment is merely exemplary in nature and is in no way intended to limit the invention, its application, or uses.

Figure 1:
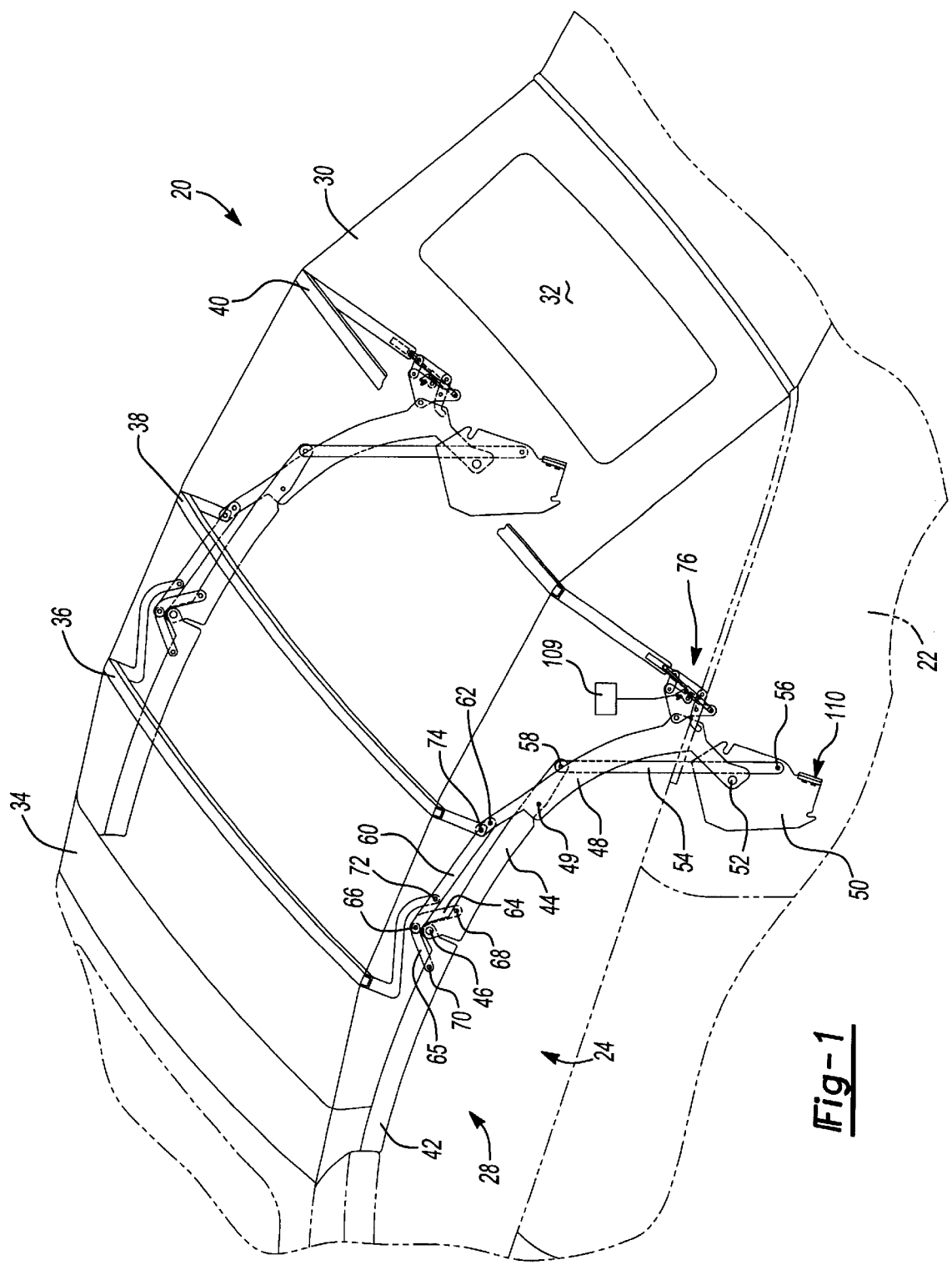
FIG. 1 is a perspective view of a vehicle with a preferred embodiment of a vehicle convertible roof according to the principles of the present invention.
Figure 2:
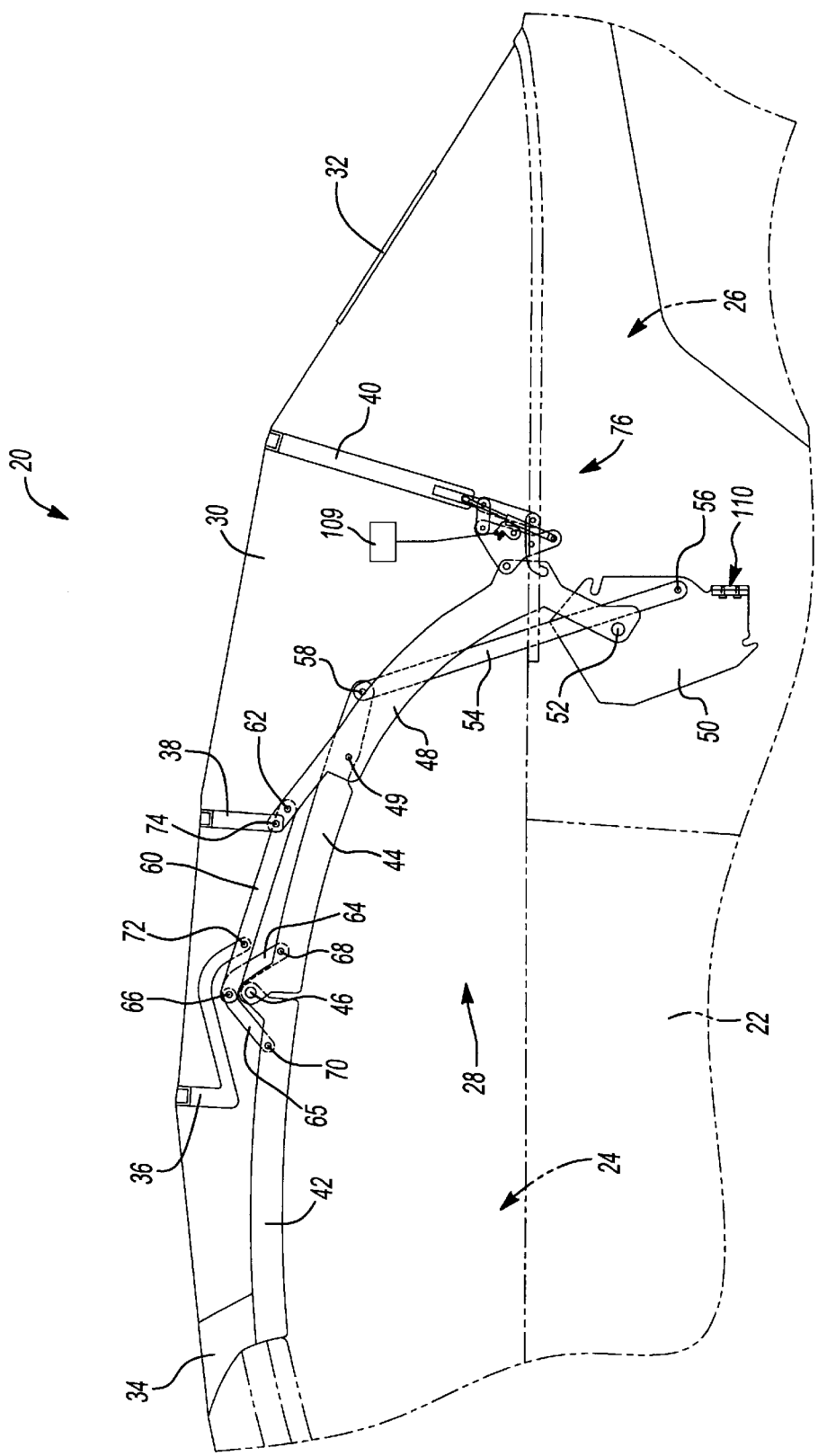
FIG. 2 is a fragmented side elevation view of the vehicle of FIG. 1 with the convertible roof in a raised and latched position and the adjustable roof bow in an extended position and with a camming surface affixed to the vehicle body.
Figure 3A:
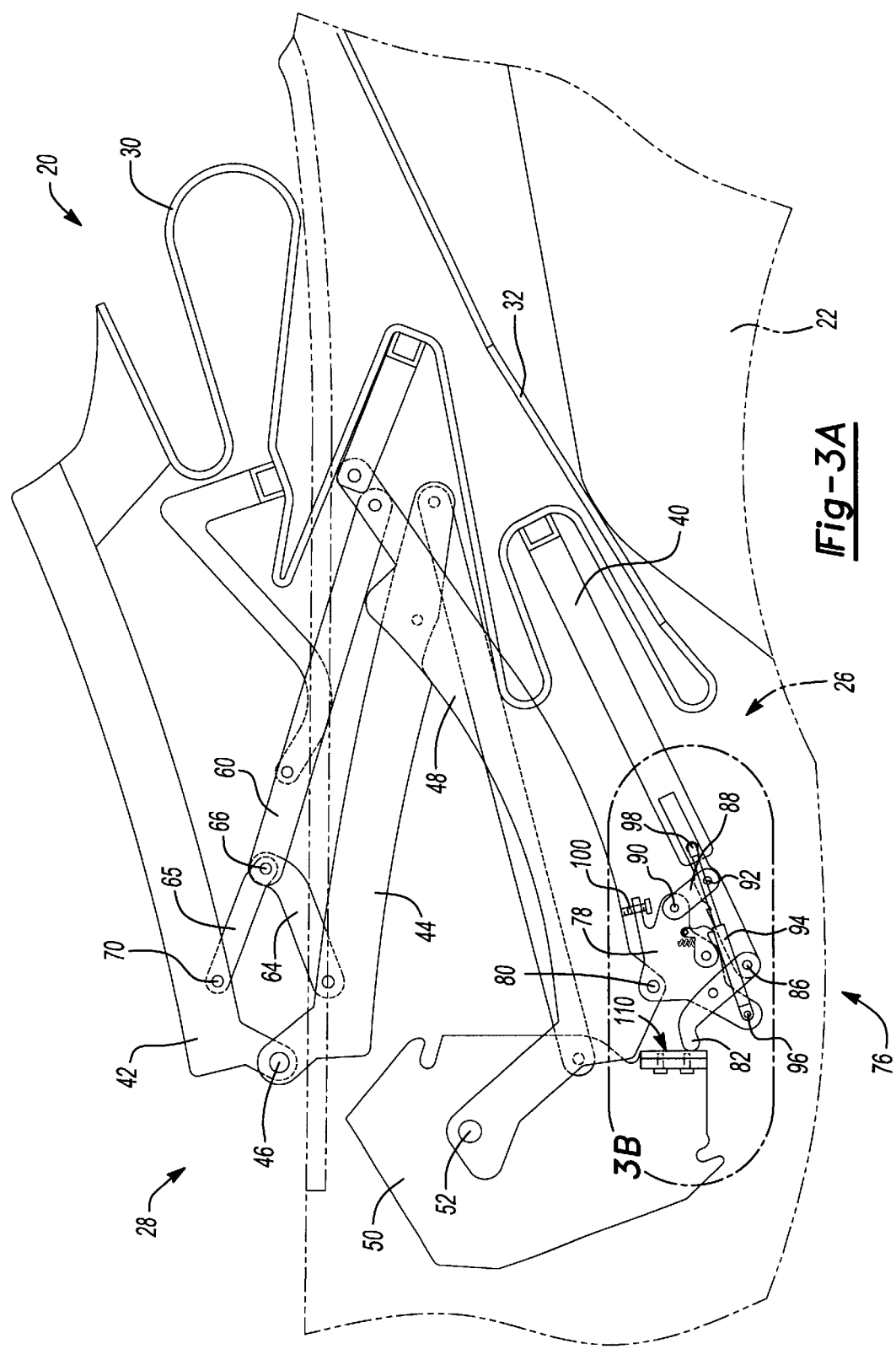
FIG. 3A is a fragmented side elevation view of the vehicle of FIG. 1 with the convertible roof in an intermediate position and the adjustable roof bow in its extended position.
Figure 4B:
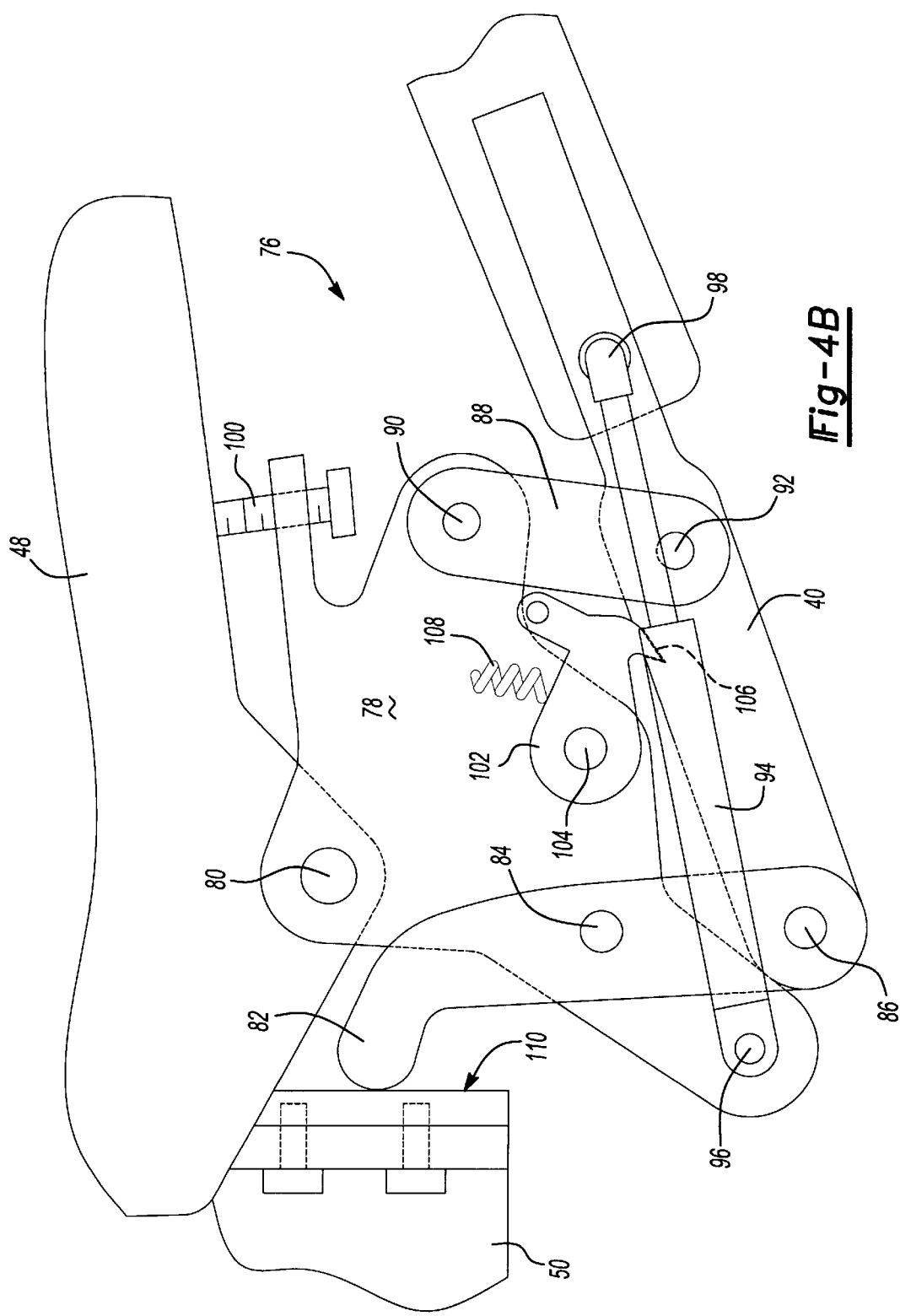
FIG. 4B is an enlarged fragmented view of a portion of the convertible roof of FIG. 4A within circle 4B.
Figure 5:
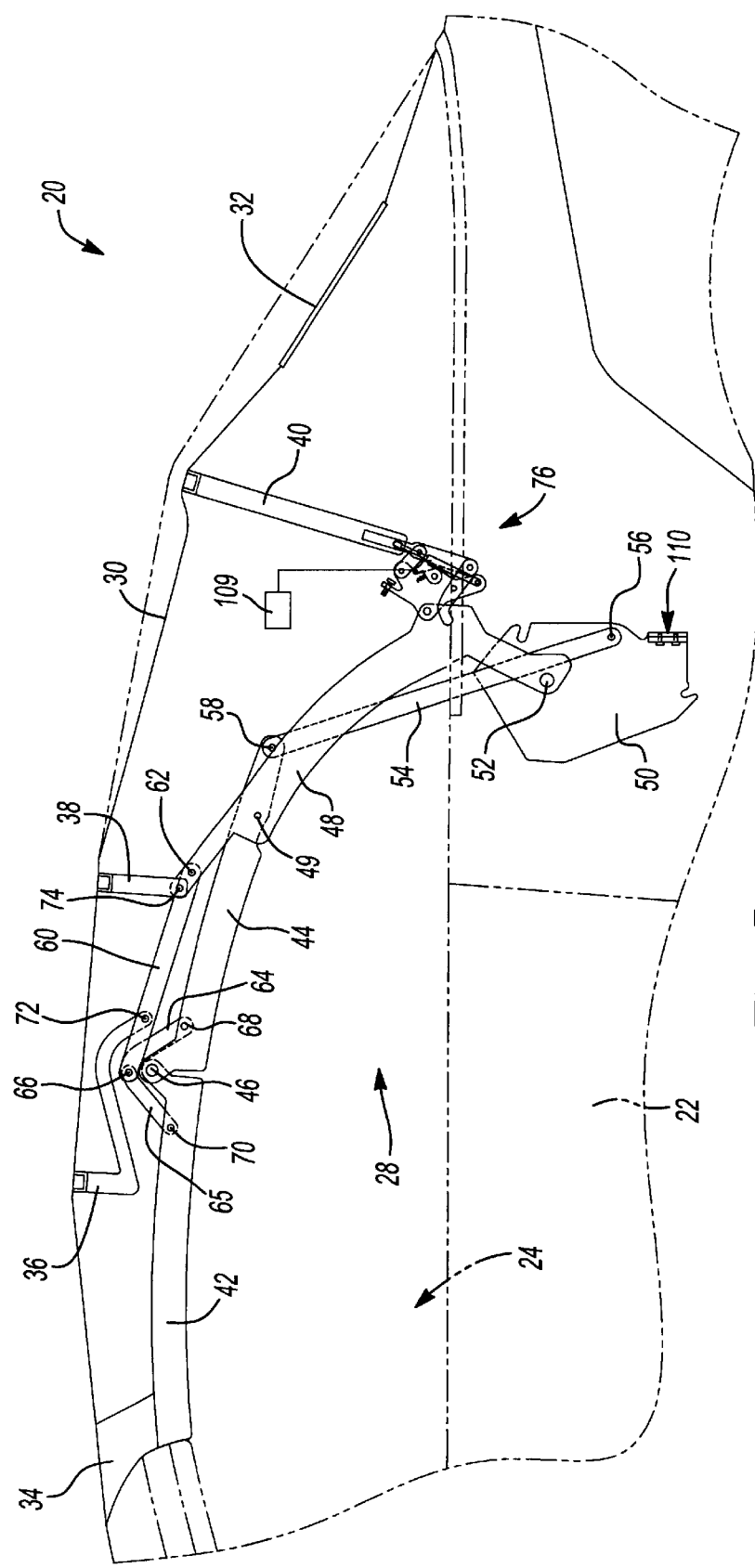
FIG. 5 is a fragmented side elevation view of the vehicle of FIG. 1 with the convertible roof in a fully raised position and the adjustable roof bow in its retracted position.

FIGS. 1–5 show the preferred embodiment of a vehicle convertible roof 20 according to the principles of the present invention. Convertible roof 20 is employed on an automotive vehicle 22 having a passenger compartment 24 and a boot well or stowage compartment 26. Convertible roof 20 is of the type utilizing a folding or top stack mechanism 28 that partially supports a pliable or flexible roof cover 30 and is operable between a fully raised position, as shown in FIGS. 1, 2 and 5, and a fully stowed position, as shown in FIG. 4A. Roof cover 30 is made from a pliable material, such as vinyl, canvas or a polyester fabric. A backlite 32 is attached to roof cover 30 and is not pivotally coupled to top stack mechanism 28. For example, reference should be made to U.S. Pat. No. 5,887,936 entitled "Backlite System for Use in an Automotive Vehicle Convertible Roof," by Cowsert, and U.S. Pat. No. 6,102,467 entitled "Backlite Retention System for Use in an Automotive Vehicle Convertible Roof," by Laurain et al., both of which are herein incorporated by reference. Backlite 32 can be made of either a rigid material, such as glass, as shown, or a pliable transparent vinyl material (not shown).

Referring to FIGS. 2–10, convertible roof 20 and top stack mechanism 28 are shown symmetrical along a longitudinal, fore-and-aft center line (not shown) of vehicle 22. Top stack mechanism 28 includes right and left roof linkages on the respective right and left sides of vehicle 22. For brevity, only the left side of top stack mechanism 28 is discussed, however, it should be understood that right side linkages are also provided as part of top stack mechanism 28 and are substantially mirror images of the left side. Also, when using the terms "fore" and "aft" and "front" and "back" in describing components of convertible roof 20, such references refer to the orientation of the components when top stack mechanism 28 is in the fully raised position.

Top stack mechanism 28 includes a forwardmost or number one roof bow 34, a number two roof bow 36, a number three roof bow 38, and an adjustable or number four roof bow 40 that each extend transversely across vehicle 22. Number one roof bow 34 has a front edge that is latched to a stationary front header panel of vehicle 22 disposed above the front windshield when in the fully raised position, as shown in FIG. 1. Number one roof bow 34 is fixedly connected to a front roof rail 42. Alternatively, number one roof bow 34 can be formed integrally with front roof rail 42, for example, first roof bow 34 and front roof rail 42 can be integrally cast from aluminum or a magnesium alloy.

Top stack mechanism 28 also includes a center roof rail 44 that is pivotally connected to front roof rail 42 at pivot 46 and pivotally connected to a rear roof rail 48 at pivot 49. Rear roof rail 48 is pivotally connected to a main pivot bracket 50 at pivot 52. Bracket 50 is affixed to the body of vehicle 22. One end of a first link 54 is pivotally connected to bracket 50 at pivot 56 while an opposite end of first link 54 is pivotally connected to center roof rail 44 at pivot 58. One end of a second link 60 is pivotally connected to an end of rear roof rail 48 at pivot 62 while an opposite end of second link 60 is pivotally connected to ends of third and fourth links 64 and 65 at pivot 66. The opposite end of third link 64 is pivotally connected to center roof rail 44 at pivot 68 while an opposite end of fourth link 65 is pivotally connected to front roof rail 42 at pivot 70. Third and fourth links 64 and 65 in conjunction with second link 60 control the movement of front roof rail 42 relative to center roof rail 44 when top stack mechanism 28 is moving between the raised and stowed positions. Number two roof bow 36 is pivotally connected to second link 60 at pivot 72. Number three roof bow 38 is pivotally connected to rear roof rail 48 at pivot 74. Number four roof bow 40 is coupled to rear roof rail 48 with a multi-link assembly 76. Multi-link assembly 76 enables number four roof bow 40 to move between an extended position, as shown in FIG. 2, and a retracted position, as shown in FIG. 5, to vary the tension of roof cover 30 when top stack mechanism 28 is in the raised position, as described below.

Multi-link assembly 76 includes a link or plate 78 that is pivotally connected to an intermediate portion of rear roof rail 48 at pivot 80. An intermediate portion of a crank 82 is pivotally connected to plate 78 at pivot 84 while an end of crank 82 is pivotally connected to an end of number four roof bow 40 at pivot 86. Crank 82 is a cam follower that acts like a bell crank. One end of a control link 88 is pivotally connected to plate 78 at pivot 90 while an opposite end of control link 88 is pivotally connected to an end portion of number four roof bow 40 at pivot 92 which is between pivot 86 and an intermediate portion of number four roof bow 40. Plate 78, crank 82, number four roof bow 40, and control link 88 form a four-bar linkage defined by pivots 84, 86, 92, and 90. This four-bar linkage controls movement of number four roof bow 40 relative to plate 78.

A biasing member 94, in this embodiment in the form of a gas strut having a fluid compressing piston in a cylinder, is pivotally attached to plate 78 at pivot 96 and pivotally attached to an intermediate portion of number four roof bow 40 at pivot 98. Biasing member 94 biases number four roof bow 40 towards its extended position and resists movement of number four roof bow 40 from its extended position toward its retracted position. A stop 100 is located on plate 78 and limits movement of plate 78 relative to rear roof rail 48 about pivot 80. Stop 100 can take a variety of forms. For example, stop 100 can be a threaded bolt that extends through a complementary threaded opening in plate 78. Due to the threadings on stop 100 and in the complementary opening in plate 78, stop 100 is adjustable such that the allowed movement of plate 78 relative to rear roof rail 48 about pivot 80 can be adjusted by adjusting the length stop 100 extends from plate 78 toward rear roof rail 48. A latch 102 is pivotally connected to plate 78 at pivot 104 and is operable to lock or latch number four roof bow 40 in its retracted position by engaging with a complementary recess 106 on an end portion of number four roof bow 40 between pivots 86 and 92. A biasing member 108, in this case in the form of a spring, is attached to plate 78 and latch 102. Spring 108 biases latch 102 toward number four roof bow 40 to enable latch 102 to engage with recess 106 when number four roof bow 40 is moved from its extended position to its retracted position, as described below. Latch 102 is also connected to an actuator 109 that is operable to disengage latch 102 from recess 106 to allow number four roof bow 40 to move from its retracted to its extended position as described below.

Multi-link assembly 76, as stated above, is operable to cause number four roof bow 40 to move between its extended and retracted positions. Number four roof bow 40 moves from its extended position to its retracted position as top stack mechanism 28 moves from the raised position to the stowed position. During a portion of the movement of top stack mechanism 28 from the raised position to the stowed position one end of crank 82 will travel along a camming surface 110 which, in this embodiment, is located on bracket 50. Movement of crank 82 along camming surface 110 causes number four roof bow 40 to move from its extended position to its retracted position and allows latch 102 to engage with recess 106 to secure number four roof bow 40 in its retracted position, as described below.

Referring now to FIGS. 2–5, operation of the preferred embodiment of convertible roof 20 is shown. When it is desired to move convertible roof 20 from the raised position to the stowed position, the latch (not shown) connecting convertible roof 20 to the front header of vehicle 22 is operated to release convertible roof 20 from the front header. Top stack mechanism 28 is then moved manually from the raised position to the stowed position by moving top stack mechanism 28 in a rearward direction. Movement of top stack mechanism 28 rearwardly causes first link 54 and rear roof rail 48 to rotate clockwise about respective pivots 56 and 52. Simultaneously, front roof rail 42 rotates clockwise relative to center roof rail 44 about pivot 46 and center roof rail 44 rotates counterclockwise relative to first link 54 and rear roof rail 48 about respective pivots 58 and 49. Also concurrently with the movement of top stack mechanism 28, backlite 32 begins to fall towards stowage compartment 28 and plate 78 rotates counterclockwise relative to rear roof rail 48 about pivot 80.

As shown in FIGS. 3A and B, continued movement of top stack mechanism 28 toward the stowed position eventually causes stop 100 on plate 78 to engage with rear roof rail 48. When stop 100 engages with rear roof rail 48, continued rotation of plate 78 counterclockwise relative to rear roof rail 48 about pivot 80 is prevented. An end of crank 82 engages with camming surface 110 on bracket 50 at about the same time stop 100 engages with rear roof rail 48. With rotation of bracket 78 about pivot 80 restrained by stop 100 and the engagement of crank 82 with camming surface 110, continued movement of top stack mechanism 28 toward the stowed position causes number four roof bow 40 to move to its retracted position. Specifically, plate 78 remains substantially stationary relative to rear roof rail 48 so that as rear roof rail 48 continues to rotate clockwise about pivot 52, camming surface 110 pushes on crank 82 which causes crank 82 to rotate clockwise relative to plate 78 about pivot 84 which in turn causes control link 88 to also rotate clockwise relative to plate 78 about pivot 90 which pulls number four roof bow 40 toward its retracted position. Continued movement of top stack mechanism 28 toward the stowed position, eventually causes number four roof bow 40 to be retracted a sufficient distance for latch 102 to engage with recess 106 on number four roof bow 40 and lock number four roof bow 40 in its retracted position, as shown in FIGS. 4A and B.

Top stack mechanism 28 is moved upwardly from the stowed position and toward the front header of vehicle 22 when it is desired to move convertible roof 20 to the raised position. While top stack mechanism 28 is moving from the stowed position to the raised position, number four roof bow 40 remains locked in its retracted position by latch 102. Thus, as shown in FIG. 5, top stack mechanism 28 can be moved to its fully raised position while number four roof bow 40 remains in its retracted position and roof cover 30 is relaxed and does not provide a resisting force to moving top stack mechanism 28 to its fully raised position. Top stack mechanism 28 can then be latched to the front header of vehicle 22. Simultaneously with or following the latching of top stack mechanism 28 to the top header of vehicle 22, latch 102 is moved away from recess 106 by actuator 109 to allow number four roof bow 40 to move from its retracted position to its extended position under the influence of biasing member 94. Number four roof bow 40 then increases the tension of roof cover 30 to provide a taut appearance to convertible roof 20. Thus, convertible roof 20 can be easily latched in its raised position without experiencing a significant resisting force by tension in roof cover 30.

Actuator 109 can take a variety of forms. For example, actuator 109 can be a cable attached to latch 102 and linked to the latching mechanism that latches top stack mechanism 28 to front header of vehicle 22. When the front header latch is actuated to latch top stack mechanism 28 to vehicle 22, the cable can be pulled (by action of the latch) thus pulling latch 102 away from recess 106 and allowing number four roof bow 40 to move to its extended position. Alternately, actuator 109 can be a solenoid which is controlled by a microprocessor so that latch 102 is moved away from recess 106 either simultaneously or subsequent to the latching of top stack mechanism 28 to the header of vehicle 22 as indicated by an adjacent limit switch. In a different embodiment, actuator 109 can be a manually operated pull cord that moves latch 102 and releases number four roof bow 40. Thus, latch 102 can be triggered or operated in a variety of manners to cause disengagement from recess 106 and allow number four roof bow 40 to move from its retracted position to its extended position.

Referring now to FIGS. 6–9, a first alternate embodiment of a vehicle convertible roof 20 according to the principles of the present invention is illustrated and indicated as 20'. Convertible roof 20' is substantially identical to convertible roof 20 shown in FIGS. 1–5 with a slightly different multi-link assembly 76', a different camming surface 110' and a different biasing member 94'. In convertible roof 20', multi-link assembly 76' includes a plate 78' that has a different configuration, does not have a stop and includes a crank 82' that has a different configuration. The configuration of crank 82' allows it to engage with a camming surface 110' which, in this embodiment, is on rear roof rail 48. Biasing member 94' is in the form of a compression spring in convertible roof 20' and performs the same function as biasing member 94 in convertible roof 20 discussed above and, as such, will not be described further. Multi-link assembly 76' performs the same function as multi-link assembly 76 shown in FIGS. 1–5. That is, multi-link assembly 76' causes number four roof bow 40 to automatically move from its extended position to its retracted position as top stack mechanism 28 moves from the raised position to the stowed position. Multi-link assembly 76' also retains number four roof bow 40 in its retracted position as top stack mechanism 28 moves from the stowed position to the raised position thereby allowing top stack mechanism 28 to be attached to the front header of vehicle 22 without encountering a significant resistance by roof cover 30.

Figure 7A:
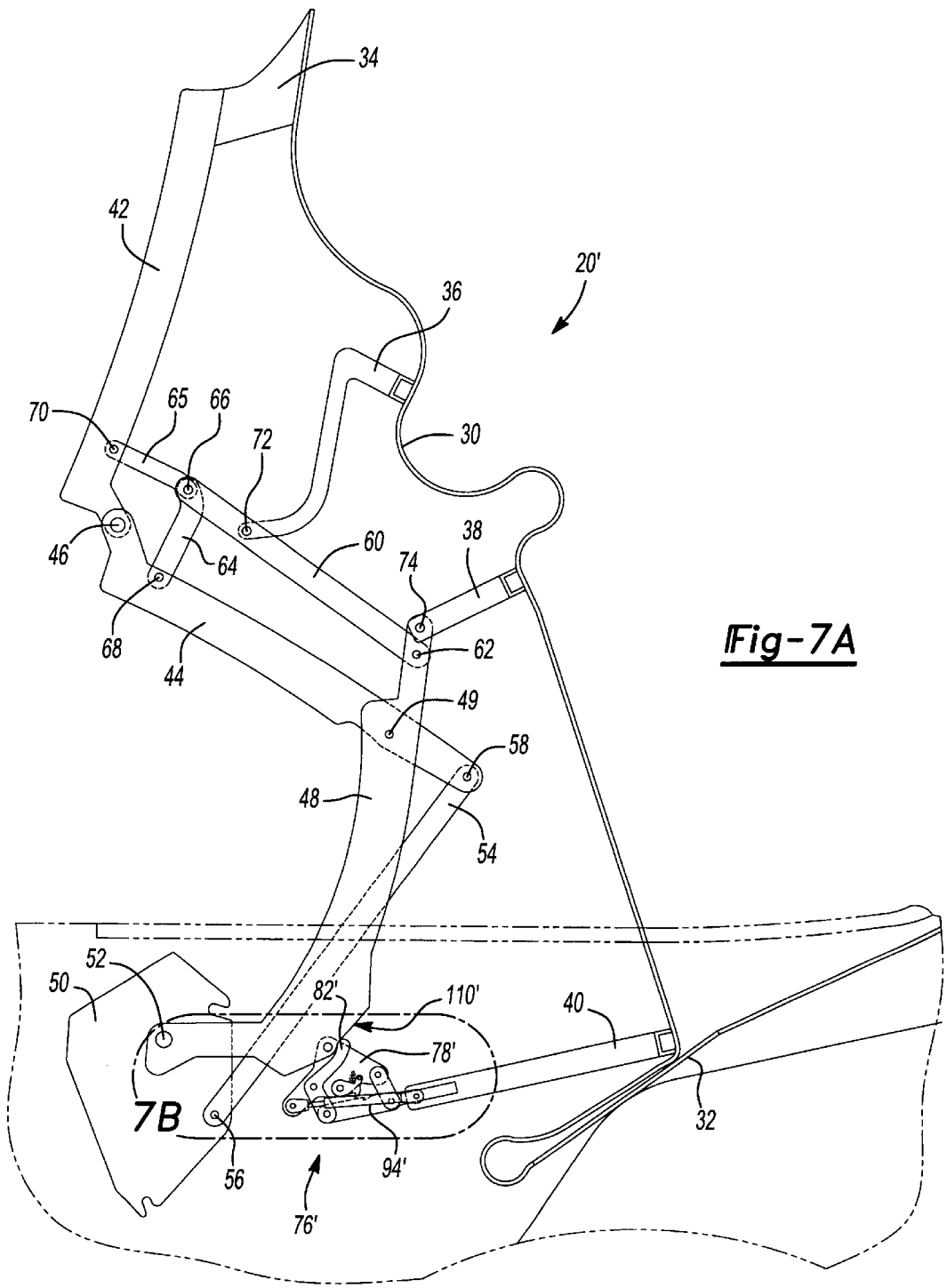
FIG. 7A is a fragmented side elevation view of the vehicle of FIG. 6 with the convertible roof in an intermediate position and the adjustable roof bow in its extended position.
Figure 7B:
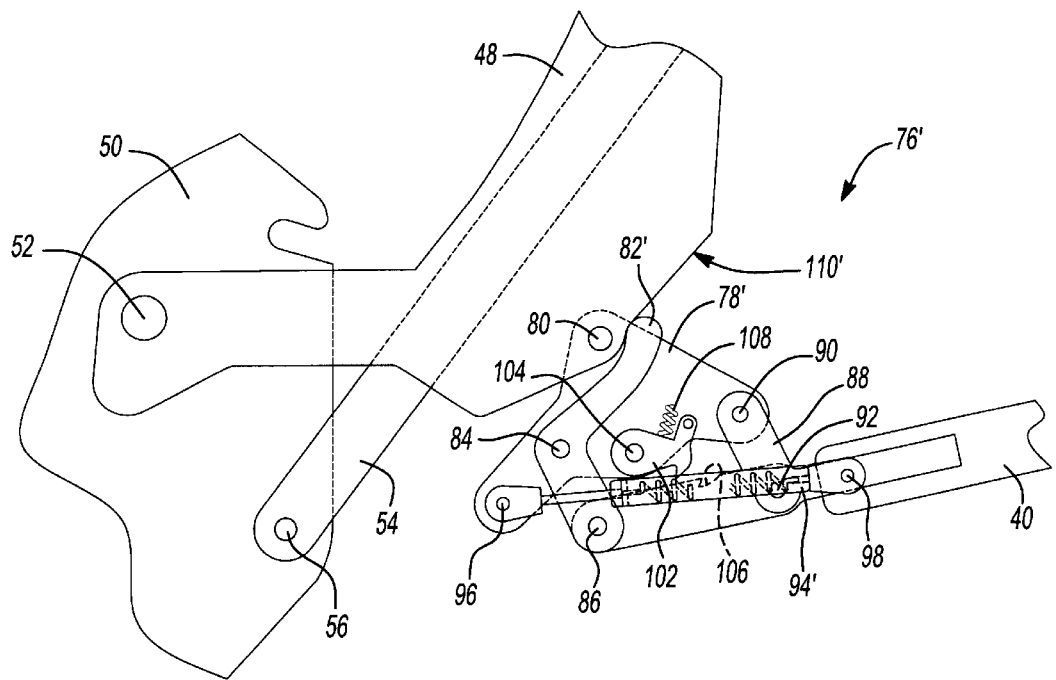
FIG. 7B is an enlarged fragmented view of a portion of the convertible roof of FIG. 7A within circle 7B.
Figure 8B:
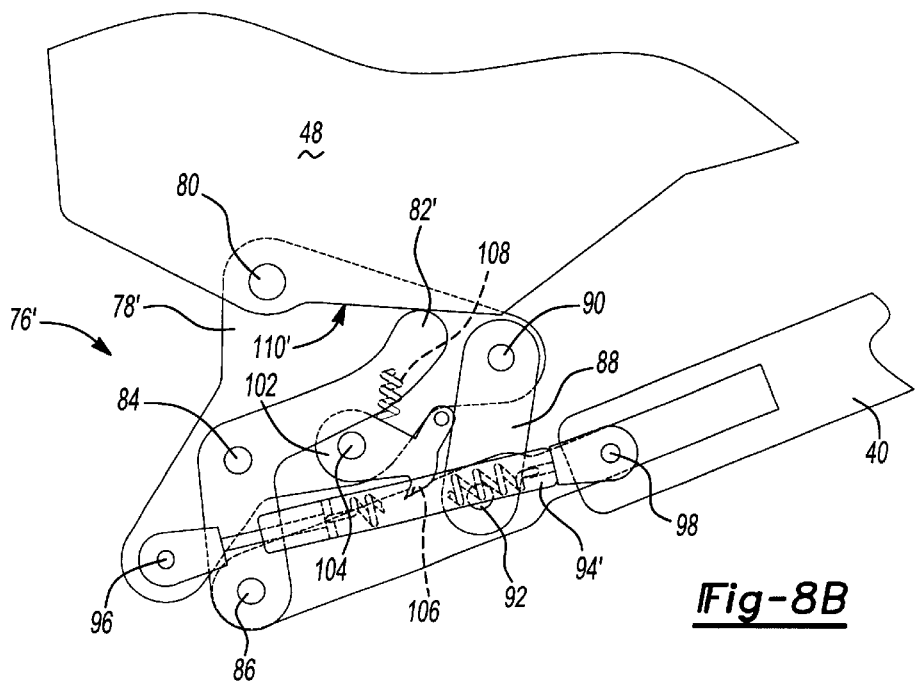
FIG. 8B is an enlarged fragmented view of a portion of the convertible roof of FIG. 8A within circle 8B.
Figure 8A:
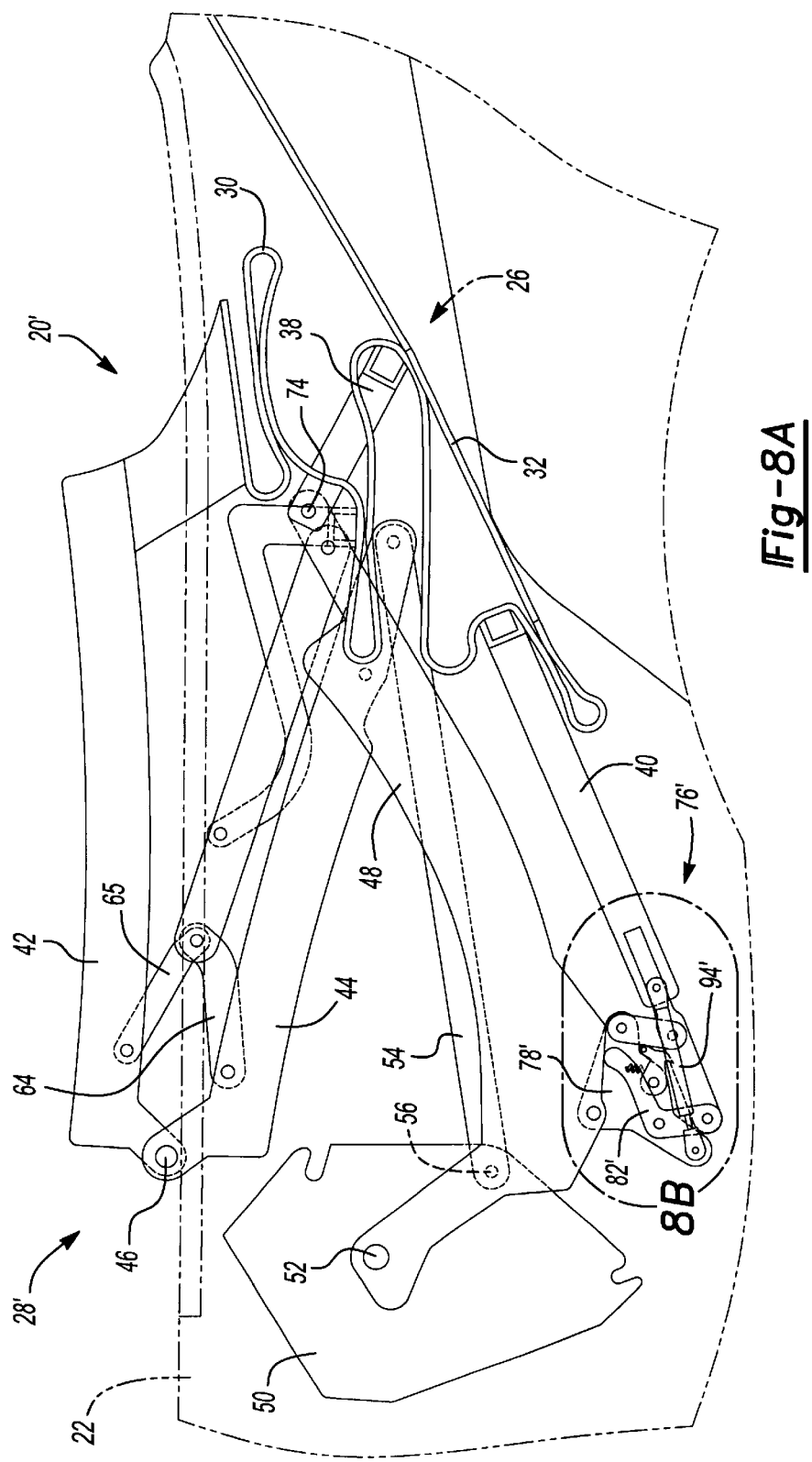
FIG. 8A is a fragmented side elevation view of the vehicle of FIG. 6 with the convertible roof in the fully stowed position and the adjustable roof bow in its retracted position.
Figure 9:
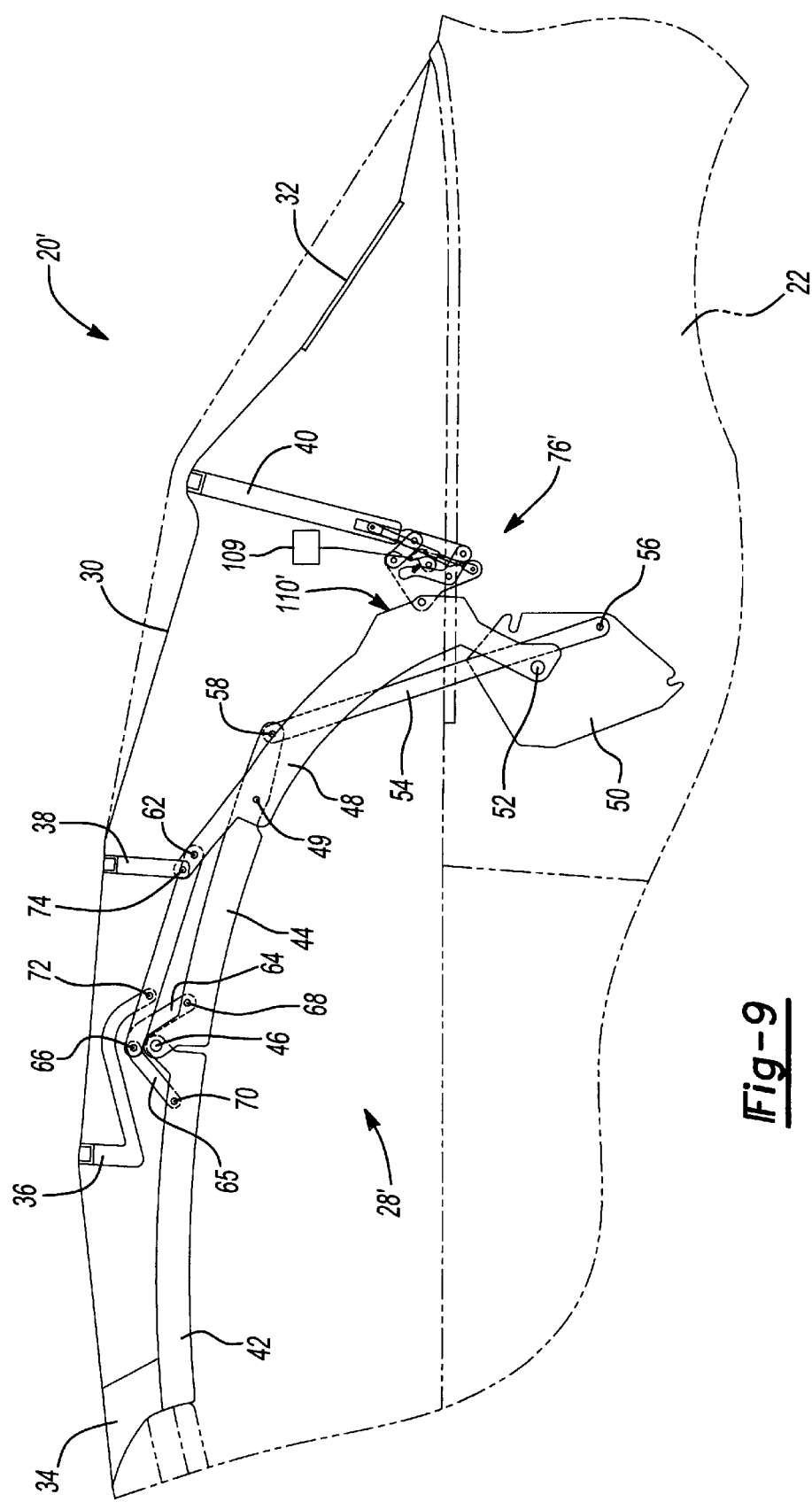
FIG. 9 is a fragmented side elevation view of the vehicle of FIG. 6 with the convertible roof in a fully raised position and the adjustable roof bow in its retracted position.

In operation, convertible roof 20' can be moved between the raised position, as shown in FIG. 6, through intermediate positions, such as that shown in FIG. 7A, to a fully stowed position, as shown in FIG. 8A. To move convertible roof 20' from the raised position to its stowed position, convertible roof 20' is unlatched from the front header of vehicle 22 and is moved rearwardly to cause top stack mechanism 28 to move toward the stowed position. Movement of top stack mechanism 28 toward the stowed position, causes rear roof rail 48 to rotate clockwise about pivot 52 which in turn causes plate 78' of multi-link assembly 76' to rotate counterclockwise relative to rear roof rail 48 about pivot 80. As top stack mechanism 28 is continued to be moved toward the stowed position, an end of crank 82' engages with camming surface 110' on rear roof rail 48. However, because plate 78' does not include a stop, continued movement of top stack mechanism 28 toward the stowed position does not cause crank 82' to pull number four roof bow 40 toward the retracted position because not enough force is generated to overcome the force supplied by biasing member 94'. When top stack mechanism 28 is moved far enough toward the stowed position, as shown in FIGS. 7A and B, number four roof bow 40 contacts backlite 32 through a portion of roof cover 30. Continued movement of top stack mechanism 28 toward the stowed position causes backlite 32 to exert a resisting force on number four roof bow 40 that is translated to plate 78' and crank 82'. When a sufficient resisting force is exerted by backlite 32 on number four roof bow 40, plate 78' will move counterclockwise relative to rear roof rail 48 about pivot 80 which causes crank 82' to move along camming surface 110', rotate clockwise relative to plate 78' about pivot 84, and pull number four roof bow 40 towards its retracted position. Preferably, multi-link assembly 76' provides a mechanical advantage sufficient to limit the required force that backlite 32 exerts on number four roof bow 40 to less than about three pounds and preferably less than about two pounds. Continued retraction of top stack mechanism 28 to the fully stowed position eventually causes number four roof bow 40 to be retracted a sufficient distance for latch 102 to engage with recess 106 and thereby lock number four roof bow 40 in the retracted position, as shown in FIGS. 8A and B.

When it is desired to move convertible roof 20' from the stowed position to the raised position, top stack mechanism 28 is moved upwardly out of stowage compartment 26 and toward the front header of vehicle 22. Number four roof bow 40 remains locked in its retracted position by latch 102 as top stack mechanism 28 moves from the fully stowed position to the fully raised position. Top stack mechanism can then be latched to the front header of vehicle 22 without encountering a significant resisting force by roof cover 30. Concurrent with or subsequent to the latching of top stack mechanism 28 to the front header of vehicle 22, latch 102 can be triggered to release number four roof bow 40 which will then move to its extended position under the influence of biasing member 94' and provides a taut appearance for convertible roof 20'. Latch 102 can be activated in any of the ways discussed above with reference to convertible roof 20. Thus, convertible roof 20' causes number four roof bow 40 to automatically move from an extended position to a retracted position as convertible roof 20' is moved from a raised position to a stowed position. Convertible roof 20' can also be moved from a stowed position to a raised position while number four roof bow 40 remains in its retracted position thereby enabling top stack mechanism 28 to be latched to a front header of vehicle 22 without experiencing resistance from roof cover 30. The tension of roof cover 30 can then be adjusted by releasing number four roof bow 40 and allowing it to move to its extended position thereby providing a desired taut appearance for convertible roof 20'.

Referring to FIGS. 10A and B, a second alternate embodiment of linkage assembly 76 is shown for use on convertible roof 20' and indicated as 76". That is, multi-link assembly 76" is shown configured to be used with a top stack mechanism 28 having a camming surface 110" on rear roof rail 48 and number four roof bow 40 experiencing a resisting force from backlite 32 (see FIGS. 7A and B) to cause number four roof bow 40 to move from its extended position to its retracted position. However, it should be understood that multi-link assembly 76" can also be configured to work with convertible roof 20, shown in FIGS. 1–5, by altering the configuration of plate 78", the configuration of crank 82" and adding a stop to plate 78".

Multi-link assembly 76" eliminates control link 88. In place of the control link, base plate 78" is provided with an opening 120 through which an end portion of number four roof bow 40 resides. The end portion of number four roof bow 40 will move or slide through opening 120 as number four roof bow 40 moves between its extended and retracted positions. If desired, opening 120 and/or the end portion of number four roof bow 40 can be provided with a low friction coating or insert, such as Teflon, a lubricious engineering grade polymeric fitting or the like, to reduce the friction between opening 120 and the end portion of number four roof bow 40. Operation of a convertible roof employing multi-link assembly 76" is substantially the same as that shown in FIGS. 6–9 and discussed above. Accordingly, operation of a convertible roof employing multi-link assembly 76" is not discussed further.

It should be appreciated that convertible roof 20 and 20', while shown as a manually operated convertible roof, can be a power actuated convertible roof without departing from the scope of the present invention. That is, a powered actuator, such as a hydraulic cylinder, pneumatic cylinder, electric motor, rotary actuator, or a similar component sufficient to apply an adequate force, can be employed to automate the movement of the convertible roof between the raised and stowed positions. Such an automatically powered, main actuator for the top stack mechanism is disclosed in U.S. Pat. No. 5,772,274, incorporated by reference herein. Additionally, while the biasing members 94 and 94' are shown as being either a gas cylinder or a coil spring, it should be appreciated that a mechanical torsion spring or other device such as a bungee cord can be employed. Moreover, it should be appreciated that biasing members 94 and 94' are designed to provide a substantially constant amount of tension in roof cover 30 throughout the life of roof cover 30. The amount of force applied by biasing members 94 and 94' will vary depending upon the fluid pressure and/or spring rate of the biasing members 94 and 94'. The amount of tensioning force applied by biasing members 94 and 94' can be adjusted, if desired by changing the spring length and/or mounting locations of biasing members 94 and 94' on number four roof bow 40 and/or base plate 78, 78', 78". For example, biasing member 94 and 94' can be provided with a clevis (not shown) on one of its ends and number four roof bow 40 or base plate 78, 78', 78" can be provided with a plurality of mounting holes through which the clevis can be attached so that the location on number four roof bow 40 and/or base plate 78, 78', 78" can be adjusted to adjust the amount of tensioning force applied by biasing member 94 and 94'. Additionally, it should be appreciated that latch 102 can be other than a hinged pawl as shown. For example, latch 102 can be a sliding bolt or a retracting pin. Furthermore, the releasing of latch 102 from recess 106 can be performed by a lanyard, can be mechanically actuated in conjunction with the operation of a front header latching function or independently of it. It could also be a simple time-delayed gas strut which allows a user time to latch the convertible roof to the front header prior to the releasing of the roof bow from the retracted to the extended position. Additionally, electrical circuitry in the solenoids which are automatically engaged in the proper sequence could be employed without deviating from the scope of the present invention. Furthermore, stop 100 can be configured to be non-adjustable, if desired, although all the benefits of convertible roof 20 may not be realized. Moreover, camming surfaces 110, 110', and 110" can be integral to a component, as shown in FIGS. 6–9, or can be an individual component that is attached to another component, as shown in FIGS. 1–5 and 10A and B, and can be used with either of the convertible roofs 20 and 20'.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A convertible roof system for an automotive vehicle, the system comprising:
   (a) a roof cover;
   (b) a camming surface; and
   (c) a folding mechanism supporting at least a potion of said cover, said mechanism being moveable between a raised position and a stowed position, said mechanism comprising:
      (i) at least two roof rails coupled together and moving relative to one another when said mechanism moves between said raised and stowed positions;
      (ii) a plurality of roof bows, at least a tensioning one of said roof bows being operable between extended and retracted positions to vary tension of said roof cover even when the remainder of said folding mechanism is substantially stationary; and
      (iii) a cam follower moving along said camming surface during a portion of movement of said mechanism between said raised and stowed positions, said cam follower being operable to cause said tensioning roof bow to move between said extended and retracted positions as said cam follower moves along said camming surface.

2. The system of claim 1, wherein said camming surface is located on one of said roof rails.

3. The system of claim 2, wherein said camming surface is located on a rearwardmost roof rail.

4. The system of claim 1, wherein said mechanism further comprises a biasing member that biases said tensioning roof bow to said extended position.

5. The system of claim 4, wherein said biasing member is a gas strut.

6. The system of claim 4, wherein said biasing member is a spring.

7. The system of claim 1, further comprising a pivot bracket that connects one of said roof rails of said mechanism to the vehicle and wherein said cam follower is pivotally attached to said pivot bracket.

8. The system of claim 1, wherein said camming surface is affixed to the vehicle.

9. The system of claim 1, wherein said tensioning roof bow is a rearwardmost roof bow of said plurality of roof bows.

10. The system of claim 1, wherein said cam follower is a bell crank.

11. The system of claim 1, wherein said mechanism further includes a latching member, said latching member retaining said tensioning roof bow in said retracted position while said mechanism moves from said stowed position to said raised position.

12. The system of claim 1, further comprising a backlite, wherein said tensioning roof bow exerts a force on said backlite as said tensioning roof bow moves from said extended position to said retracted position.

* * * * *

UNITED STATES PATENT AND TRADEMARK OFFICE
CERTIFICATE OF CORRECTION

PATENT NO. : 6,695,385 B1
DATED : February 24, 2004
INVENTOR(S) : Eric W. Lange

It is certified that error appears in the above-identified patent and that said Letters Patent is hereby corrected as shown below:

Title page,
Item [57], ABSTRACT,
Line 1, "include" should be -- includes --.

Column 9,
Line 42, "potion" should be -- portion --.

Signed and Sealed this

Third Day of August, 2004

JON W. DUDAS
*Acting Director of the United States Patent and Trademark Office*